(12) United States Patent
Powers et al.

(10) Patent No.: US 7,424,632 B2
(45) Date of Patent: Sep. 9, 2008

(54) SYSTEMS AND METHODS THAT FACILITATE STATE MACHINE POWER AND WAKE STATE MANAGEMENT

(75) Inventors: Stephen B. Powers, Seattle, WA (US); Walt G. Jones, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 512 days.

(21) Appl. No.: 10/779,300

(22) Filed: Feb. 13, 2004

(65) Prior Publication Data

US 2005/0182977 A1   Aug. 18, 2005

(51) Int. Cl.
G06F 1/32 (2006.01)

(52) U.S. Cl. .................................. 713/323; 713/310
(58) Field of Classification Search ............... 713/323, 713/324, 310
See application file for complete search history.

(56) References Cited

U.S. PATENT DOCUMENTS

| | | | |
|---|---|---|---|
| 5,574,920 A | 11/1996 | Parry | |
| 5,638,028 A | 6/1997 | Voth | |
| 5,640,573 A * | 6/1997 | Gephardt et al. | 713/340 |
| 5,784,628 A | 7/1998 | Reneris | |
| 5,802,305 A | 9/1998 | McKaughan et al. | |
| 6,209,088 B1 | 3/2001 | Reneris | |
| 6,243,821 B1 | 6/2001 | Reneris | |
| 6,289,464 B1 | 9/2001 | Wecker et al. | |
| 6,366,522 B1 * | 4/2002 | May et al. | 365/227 |
| 6,446,214 B2 | 9/2002 | Chrysanthakopoulos | |
| 6,609,182 B1 | 8/2003 | Pedrizetti et al. | |
| 6,631,469 B1 * | 10/2003 | Silvester | 713/2 |
| 6,772,241 B1 * | 8/2004 | George et al. | 710/36 |
| 6,826,701 B1 | 11/2004 | Plante | |
| 6,862,188 B2 | 3/2005 | Calhoon | |
| 6,865,683 B2 | 3/2005 | Padswer et al. | |
| 6,883,037 B2 | 4/2005 | Kadatch et al. | |
| 6,885,974 B2 | 4/2005 | Holle | |
| 6,918,115 B2 | 7/2005 | Vargas et al. | |
| 6,931,553 B1 | 8/2005 | Plante et al. | |
| 6,952,784 B1 * | 10/2005 | Miller | 713/300 |
| 7,017,037 B2 | 3/2006 | Fortin et al. | |

(Continued)

OTHER PUBLICATIONS

Rong Zheng, et al., On-demand Power Management for Ad Hoc Networks, IEEE Infocom 2003, 2003, 11 pages.
Kenneth J. Christensen, et al., Enabling Power Management for Network-attached Computers, International Journal of Network Management, 1998, pp. 120-130, vol. 8.

Primary Examiner—Thuan N Du
(74) Attorney, Agent, or Firm—Amin, Turocy & Calvin, LLP

(57) ABSTRACT

The present invention relates to systems and methods that manage a state machine's wake state to facilitate power management. The systems and methods comprise a state manager that can be employed to receive signals transmitted to a state machine that has transitioned to a lower power state. Thus, when a signal is transmitted to the state machine, the state manager can initially receive the signal rather the state machine. The state manager can interpret the signal and determine whether a low power coprocessor can respond to the signal. If the low power coprocessor can respond, then the coprocessor responds while the state machines remains in the lower power state. The system and methods can be concurrently employed by a plurality of state machines residing on similar and/or disparate networks, buses, backplanes, etc. The foregoing facilitates state machine power consumption reduction while maintaining timely responses.

27 Claims, 12 Drawing Sheets

U.S. PATENT DOCUMENTS

| | | |
|---|---|---|
| 7,051,220 B2 | 5/2006 | Geiger et al. |
| 7,065,659 B2 | 6/2006 | Malueg et al. |
| 7,096,034 B2 | 8/2006 | Zhang et al. |
| 7,099,689 B2 | 8/2006 | Bahl et al. |
| 7,103,788 B1 | 9/2006 | Souza et al. |
| 7,110,783 B2 | 9/2006 | Bahl et al. |
| 7,131,011 B2 | 10/2006 | Westerinen et al. |
| 7,134,027 B2 | 11/2006 | Calhoon |
| 7,137,117 B2 | 11/2006 | Ginsberg |
| 2002/0099966 A1* | 7/2002 | Cabler ........................ 713/323 |
| 2003/0198196 A1 | 10/2003 | Bahl et al. |
| 2003/0210658 A1 | 11/2003 | Hernandez et al. |
| 2004/0003299 A1 | 1/2004 | Malueg et al. |
| 2004/0120278 A1 | 6/2004 | Krantz et al. |
| 2004/0268159 A1 | 12/2004 | Aasheim et al. |

* cited by examiner

SYSTEMS AND METHODS THAT FACILITATE STATE MACHINE POWER AND WAKE STATE MANAGEMENT

TECHNICAL FIELD

The present invention generally relates to power management, and more particularly to systems and methods that intelligently manage a state machine's wake state and signal processing in order to reduce state machine power consumption.

BACKGROUND OF THE INVENTION

A computer network typically comprises a plurality of microprocessor-based devices, such as computers, that are interconnected via hardware (e.g., network cables, hubs, switchers, etc.) and/or wireless techniques (e.g., radio frequency (RF), infrared (IR), etc.) and employed in connection with layers of software (e.g., protocols, etc.) to facilitate interaction between at least two devices in order to provide a fast, efficient and cost effective means to exchange information. In many instances, other devices such as printers, scanners and facsimile machines are coupled to the computer network to enhance the exchange of information. For example, data can be output to paper as a graph(s), a table(s), a chart(s), and the like. The economical, efficiency and connectivity benefits afforded by computer networks are commonly exploited by corporations, medical facilities, businesses, the government, and educational facilities, wherein computer networks are employed to improve everyday tasks such as correspondence (e.g., via email, instant messaging and chat rooms), documentation, problem solving, mathematical computation, scheduling, planning, and information gathering.

In general, computer networks are differentiated through characteristics such as size, user base, architecture and topology. For example, Local Area Networks (LANs) and Wide Area Networks (WANs) are two common networks that include an indication of size/user based within the network name. For instance, a LAN typically is associated with a relatively small geographic area such a department, building or group of buildings, and employed to connect local workstations, personal computers, printers, copiers, and scanners. A WAN typically is associated with networks that span large geographical areas, and can include one or more smaller networks, such as one or more LANs. For example, a WAN can be employed to a couple computers and/or LANs that reside on opposite ends of a country and/or world. The most popular WAN today is the Internet. These networks can be further delineated to provide more specific information such as Campus Area Networks (CANs), Metropolitan Area Networks (MANs), and Home Area Networks (HANs). In general, a CAN is associated with a limited geographic area, such as a campus or military base; a MAN is more generic and designed to provide for a town or city; and a HAN resides within a user's home to connect digital devices such as computers, home monitoring system (e.g., lighting and temperature), entertainment centers (e.g., audio and video systems) and security (e.g., alarm and CCD cameras) systems.

Architectural differentiation includes peer-to-peer and client-server networks. With a peer-to-peer architecture, computers are connected to one another (e.g., via a hub) and share the same level of access on the network. In addition, the computers can be configured with security levels and/or sharing rights such that files can be directly accessed and shared peer-to-peer, or between computers. In contrast, a client-server network comprises at least one client machine, which can be a user's computer, and a server, which typically is employed to store and execute shared applications. One advantage of employing a client-server configuration is that it can free local disk space on clients by providing a central location for file storage and execution. Common topologies classifications include bus, ring and star topologies. With a bus topology, a central channel or backbone (the bus) couples computers and/or devices on the network. With a ring topology, computers and/or devices are coupled as a closed loop. Thus, information may travel through the several computers prior to reaching a destination computer. With a star topology, computers are connected to a central computer.

Generally, when one network component transmits a signal to another network component, the network component that transmits the signal typically expects a response from the receiving network component within a reasonable time frame. If a response is not received within a reasonable time (e.g., defined by a time-out), the communication usually terminates. The foregoing concept extends to essentially any state machine attempting to communicate with another state machine via a network, bus and/or direct connection. In order to respond in a timely manner, many state machines continuously operate in a full power state such that the state machine can monitor, receive and promptly respond to an incoming signal.

However, the industry trend is to minimize power consumption through mechanisms such as automatic power management utilities that transition a state machine from a full power state to a lower power or "off" state. For example, many computers utilize standard power management technologies such as Advanced Configuration and Power Interface (ACPI), which enables an operating system to control power by automatically transitioning the computer to a Standby, Suspend, Hibernate, Sleep, Deep Sleep, etc. state. However, a state machine residing in such lower power state may not be able to receive incoming signals, may ignore incoming signals and/or may be invoked to transition to the high power (e.g., wake) state when a signal arrives in order to process the signal. The latter typically is associated with a time delay since transitioning to the high power state can include component initialization, error checking, motor ramp-up, hand shaking, etc. In addition, many times state machines are invoked to transition to a high power to handle trivial requests such as a responding to a ping. Thus, with conventional systems a dichotomy exists between conserving power and timely responding to incoming signals.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The system and methods of the present invention provide a novel technique that reduces state machine power consumption while maintaining the ability to efficiently handle incoming signals. The system and methods comprise a state management component that can be utilized to receive incoming signals for a state machine residing in a lower power (e.g., standby, suspend, hibernate, sleep, and deep sleep) or off state. The state management component interprets incoming signals and determines whether the state machine should transition out of a wake and respond to the incoming signals or whether a low-power logic element (e.g., silicon gates in a logic array, a coprocessor, . . . ) should respond to the signals. The state management component then invokes the state machine and/or low-power logic element, which responds accordingly. Conventional systems are typically configured to either handle incoming signals (e.g., they are virtually always in a high power state when "on") or to conserve power (e.g., transition to a lower power state based on predefined criteria wherein there is a delay in responding to incoming signals)

In one aspect of the present invention, a system is provided that facilitates state machine wake state management. The system comprises a state management component and a low power logic element. The state management component can be employed to receive a signal transmitted to a state machine that has transitioned to a lower power state to reduce or maintain power consumption. Upon receiving a signal, the state management component can interpret the signal and determine whether the state machine and/or the logic element should respond to the signal. Subsequently, the state management component can invoke the state machine and/or the logic element r to respond.

In another aspect of the present invention, a power management system is utilized to manage state for a computing system. In general, the computing system operates under full power and receives and handles incoming signals. Typically, such computing system can transition to a lower power state when not active. When in the lower power state, a state management component can be utilized to receive incoming signals. Upon receiving an incoming signal, the state management component can interpret the signal and determine whether the computing system and/or a low power coprocessor should respond. If it is determined that the low power coprocessor should respond, the state management component invokes the low power coprocessor and the computing system can remain in the lower power state. It is to be appreciated that the system can employ an intelligence component to facilitate interpreting incoming signals and determining whether the computing system and/or the coprocessor should respond to an incoming signal. In addition, the state machine can reside within the coprocessor, and/or the coprocessor can include decision logic that determines which entity should respond to the signal.

In yet another aspect of the present invention, the state management component can be utilized with state machines interfaced to buses, network, backplanes, etc. In addition, the state management component can be concurrently utilized by a plurality of state machines residing on disparate buses, network, backplanes, etc. Furthermore, such management can invoke intervening state machines that invoke other state machines. In other aspects of the invention, state diagrams, flow diagrams and methods are provided that facilitate power management.

To the accomplishment of the foregoing and related ends, the invention comprises the features hereinafter fully described and particularly pointed out in the claims. The following description and the annexed drawings set forth in detail certain illustrative aspects and implementations of the invention. These are indicative, however, of but a few of the various ways in which the principles of the invention may be employed. Other objects, advantages and novel features of the invention will become apparent from the following detailed description of the invention when considered in conjunction with the drawings.

DETAILED DESCRIPTION OF THE INVENTION

Figure 1:
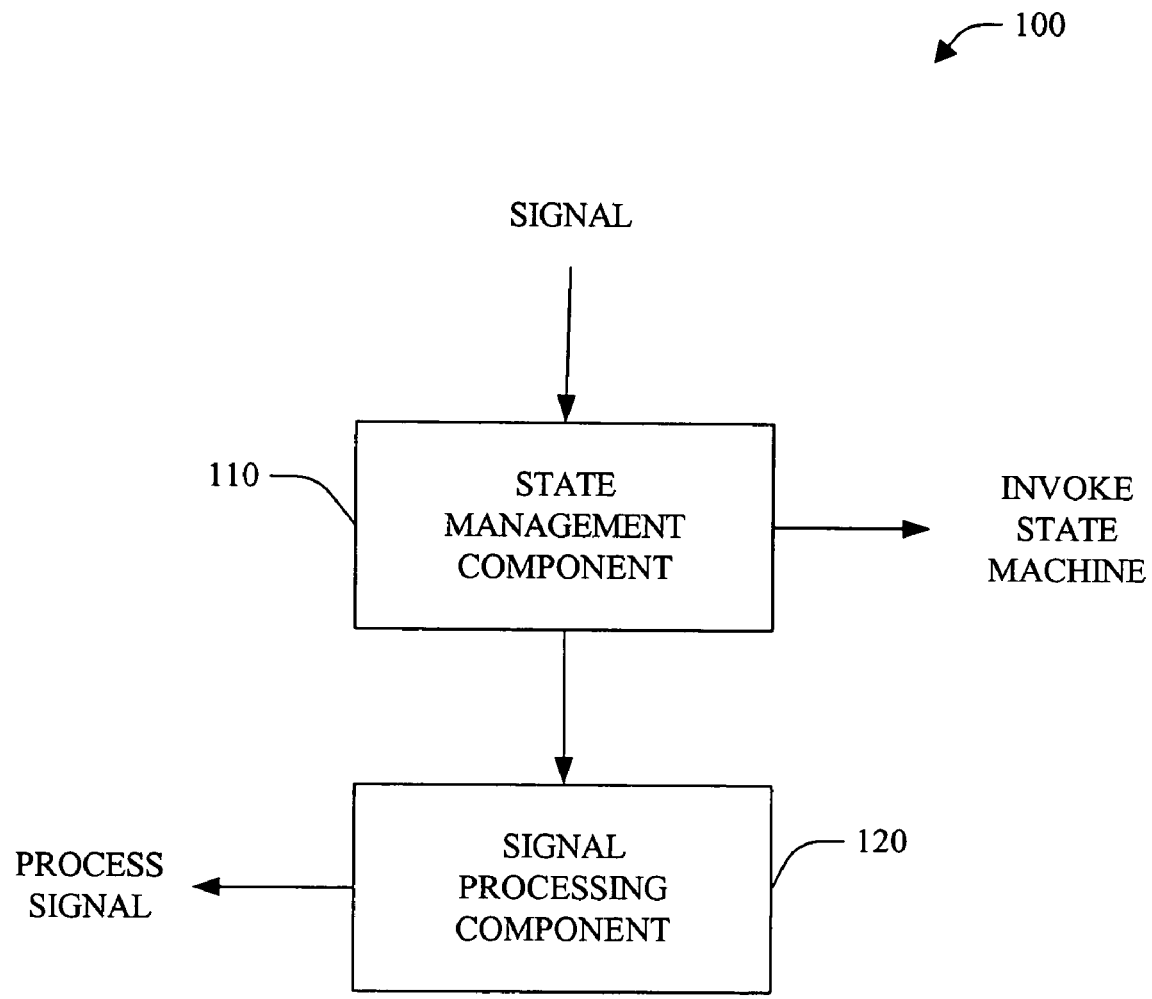
FIG. 1 illustrates an exemplary system that facilitates state machine wake state management, in accordance with an aspect of the present invention.

The present invention provides systems and methods that facilitate state machine power management. The system and methods comprise a state management component that can be utilized to receive incoming signals for a state machine residing in a lower power such as standby, suspend, hibernate, sleep, deep sleep, and off, for example. The state management component interprets incoming signals and determines whether the state machine should transition to a wake state and respond to the incoming signals or whether a low-power coprocessor should respond to the signals. The state management component accordingly invokes the state machine and/or low-power coprocessor to respond.

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

FIG. 1 illustrates a system 100 that facilitates state machine wake state management, in accordance with an aspect of the present invention. The system 100 comprises a state management component 110 and a signal processing component 120.

The system 100 can be employed in connection with essentially any state-machine (e.g., a computer, a VCR, a stereo, a phone, an alarm system, an automobile ignition system, etc.) that transitions to a lower power state to reduce power consumption when full power is not required. When employed in such state machines, the system 100 can determine whether the state machine and/or the signal processing component 120 (e.g., a low-power logic element) should process incoming signals.

By way of example, the system 100 can be employed with one or more computers. Typically, such devices provide BIOS, application and/or operating system (OS) level power management that enables selective removal and/or reduction of power to at least portions of components (e.g., hard drive and monitor) when respective portions do not require full power (e.g., due to inactivity). The removal and/or reduction of power typically coincides with a transition from a high power state to a lower power state; and, thus, the system 100 can be utilized to facilitate state management for lower power states.

When activated in connection with a state machine, signals transmitted to the state machine can be received by the state management component 110. For example, when employed in connection with a computer in a lower power state (e.g., standby, suspend, hibernate and sleep), the state management component 110 can receive network and/or bus traffic associated with the computer. In another example, the system 100 can be employed in connection with a home entertainment center, wherein the state management component 110 can receive input signals such as a power signal, a channel signal, a volume signal, a mode selection signal (e.g. to select one of a CD player, television, a cassette player, a radio tuner and a turntable), for example. In yet another example, the state management component 110 can receive wireless (e.g., RF) signals associated with an automobile (e.g., door lock/unlock, ignition and defroster). In these examples, the state machines (the computer, home entertainment center and automobile) can remain in a lower power state while the state management component 110 receives and initially handles the incoming signals.

The state management component 110 can additionally be utilized to interpret the received signals. Thus, continuing with the examples from above, the state management component 110 can analyze the signals to determine processing requirements. Such analysis can employ intelligence that utilizes inferences, classifiers, probabilities, statistics, and rule bases, for example. If it is determined that a respective state machine should respond to the signals, the state management component 110 can invoke (e.g., wake-up, activate and notify) the state machine to transition to the higher power state, wherein the signal can be conveyed to the state machine. It is to be appreciated that while the state machine is processing the signal, the state management component 110. can continue to receive incoming signals. Thus, after responding to the signal, the state machine can transition back to a lower power state without having to submit a request for the services of system 100.

If it is determined that the signal processing component 120 can respond to the signal, the state management component 110 invokes the signal processing component 120. In this circumstance, the state machine can remain in the lower power state while the signal processing component 120 processes the signal. For example, a request for an IP address typically can be handled by the signal processing component 120 while the computer is in the lower power state. In another example, an unlock door signal can be handled wherein the signal processing component 120 can lock/unlock the door.

If it is determined that both the signal processing component 120 and the state machine should respond to the signal, the state management component 110 can invoke both devices. Similar to above, the state machine and the processing component 120 can transition to a high power state and respond to respective portions of the signal. It is to be appreciated that in accordance with various aspects of the present invention, the state machine can reside within the processing component 120, and/or the processing component 120 can include decision logic that determines which entity should respond to the signal and/or invokes such entity.

Figure 2:
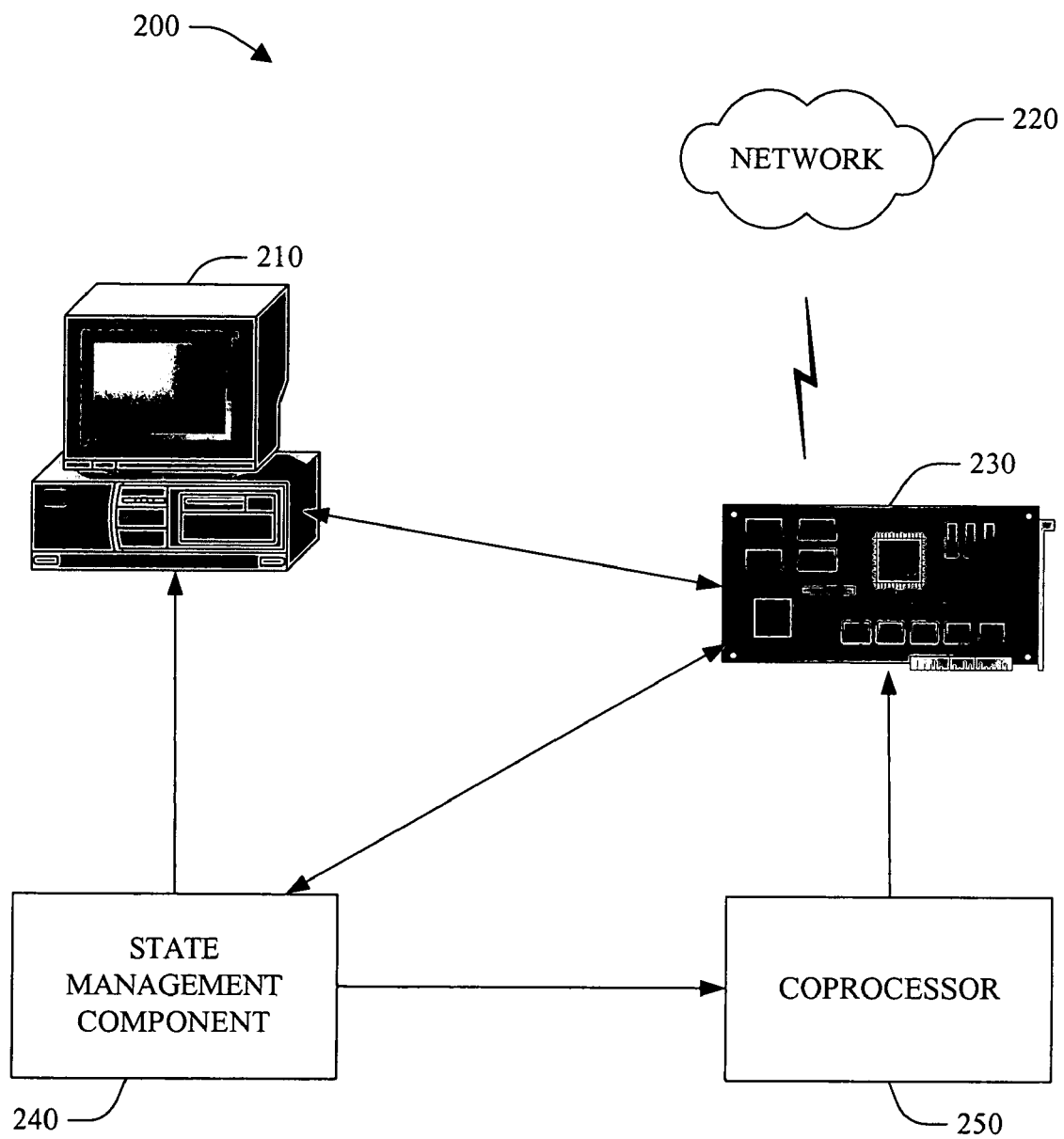
FIG. 2 illustrates an exemplary system that facilitates wake state management in connection with a computing system, in accordance with an aspect of the present invention.

FIG. 2 illustrates a computing system 200 that employs intelligent wake state management to facilitate power management, in accordance with an aspect of the present invention. The system 200 comprises a computer 210 interfaced with a network 220 via a network interface 230. As depicted, the computer 210 is a desktop; however, it is to be appreciated that any computing system such as a laptop, workstation, handheld, etc. can be employed. When in a full power state, the computer 210 typically receives and responds to all incoming signals from the network 220. Such signals and responses can be binary and/or ASCII data transmitted as one or more data packets, data streams, and/or data bursts, for example.

The network interface 230 can be essentially any network interface that can be utilized to connect to a network. As depicted, the network interface 230 can be a network card and, as such, the network interface 230 can be employed within a particular or multiple types of networks, protocols, and/or media (e.g., audio, images, and video). For example, the network interface 230 can be configured for a local-area network (LAN), a wide-area network (WAN), a campus-area network (CAN), a metropolitan-area network MAN), and/or a home-area network (HAN). In addition, the network interface 230 can be employed within a bus, star, and/or ring network that is based on a peer-to-peer and/or client/server architecture. Moreover, any suitable networking protocol such as Ethernet (e.g., 10Base-T, 100Base-T (Fast Ethernet) and 1000Base-T (Gigabit Ethernet)) and token-ring network, for example, can be utilized.

The computer 210 can utilize power management techniques that transition the computer 210 to a lower power state during periods of inactivity, for example. In one example, power can be removed from components such as hard drives and monitors while volatile memory is provided with enough power to persist data stored therein. It is understood that various other components can additionally and/or alternatively transition to a similar lower power mode; however, for sake of brevity and explanatory purposes, the hard drive and monitor are noted here. When an attempt is made to utilize these components, the computer 210 can transition back to the full power.

In order to improve power management, the computer 210 can utilize the state management component 240 to receive and interpret incoming messages and decide whether the computer 210 should respond. Various techniques can be utilized to activate the state management component 240. For example, the computer 210 can request the services of the state management component 240. In another example, the state management component 240 can detect when the computer 210 transitions to a lower power state and automatically begin to handle incoming messages. Essentially any mechanism can be utilized to direct incoming signals to the state management component 240. For example, the state management component 240 can actively monitor the network interface 230 and pull incoming signals. In another example, incoming signals can be stored and retrieved. In yet another example, the state management component 240 can utilize the computing system 210 as a pass through to obtain incoming signals.

Upon receiving a signal, the state management component 240 can interpret the signal, which can include extracting information from and/or analyzing the signal to determine whether the computer 210 or a low power coprocessor 250 should respond to the signal. It is to be appreciated that the state management component 240 can employ an intelligence component to facilitate decision-making.

If the state management component 240 determines that the low power coprocessor 250 should respond to the signal, the state management component 240 can notify the low power coprocessor 250. Similar to the computer 210, the coprocessor 250 can reside in a lower power state when idle. After transitioning to a wake state, the incoming signal can be conveyed to the coprocessor 250. It is to be appreciated that the incoming signal can be conveyed serially and/or concurrently with the wake notification. For example, the state management component 240 can concurrently and/or serially provide the notification and the incoming signal to the coprocessor 250. In another example, the state management component 240 can provide the notification to the coprocessor 250, and the coprocessor 250 can retrieve and/or request the signal. Alternatively, the incoming signal can be provided to the coprocessor 250 by the network card 230 or retrieved from memory.

Once activated, the coprocessor 250 can respond to the incoming signal. In one instance, a single response can adequately service the incoming signal. For example, the incoming signal can be an IP address request. The coprocessor 250 can respond by broadcasting a message that includes the IP address of the computer 210. In other instances, the coprocessor 250 can initiate dialogue with the owner of the incoming signal, for example, to obtain further information and/or clarify the information received. After responding to the incoming signal, the coprocessor 250 can respond to another incoming signal or transition to a lower power state and wait for the next wake notification from the state management component 240 and/or other component (e.g., a manual invocation from a user).

If the state management component 240 determines that the computer 210 should respond, the state management component 240 invokes the computer 210. Similar to waking the coprocessor 250, the computer 210 can retrieve and/or receive the incoming signal. After transitioning to a wake state and obtaining the incoming signal, the computer 210 can respond to the incoming signal. Also similar to the coprocessor 250, the computer 210 can respond to the signal and/or initiate dialogue to obtain further information. After responding, the computer 210 can respond to other incoming signals or transition back to a lower power state and wait for the next wake notification from the state management component 240 and/or other component (e.g., a manual invocation from a user).

If the state management component 240 determines that both the coprocessor 250 and the computer 210 should respond to the incoming signal, the state management component 240 can facilitate determining which portions of the signal should be handled by which device and convey such portions to respective devices. In addition, a portion of the signal that is initially provided to either device can be subsequently provided to the other device, for example, upon re-evaluating which device should respond to the portion of signal.

After responding to respective portions of the incoming signal, the coprocessor 250 and the computing system 210 can remain active and respond to at least another portion of an incoming signal or transition (serially and/or concurrently) to a lower power state and wait for a next wake notification from the arbiter 230 and/or other component.

Figure 3:
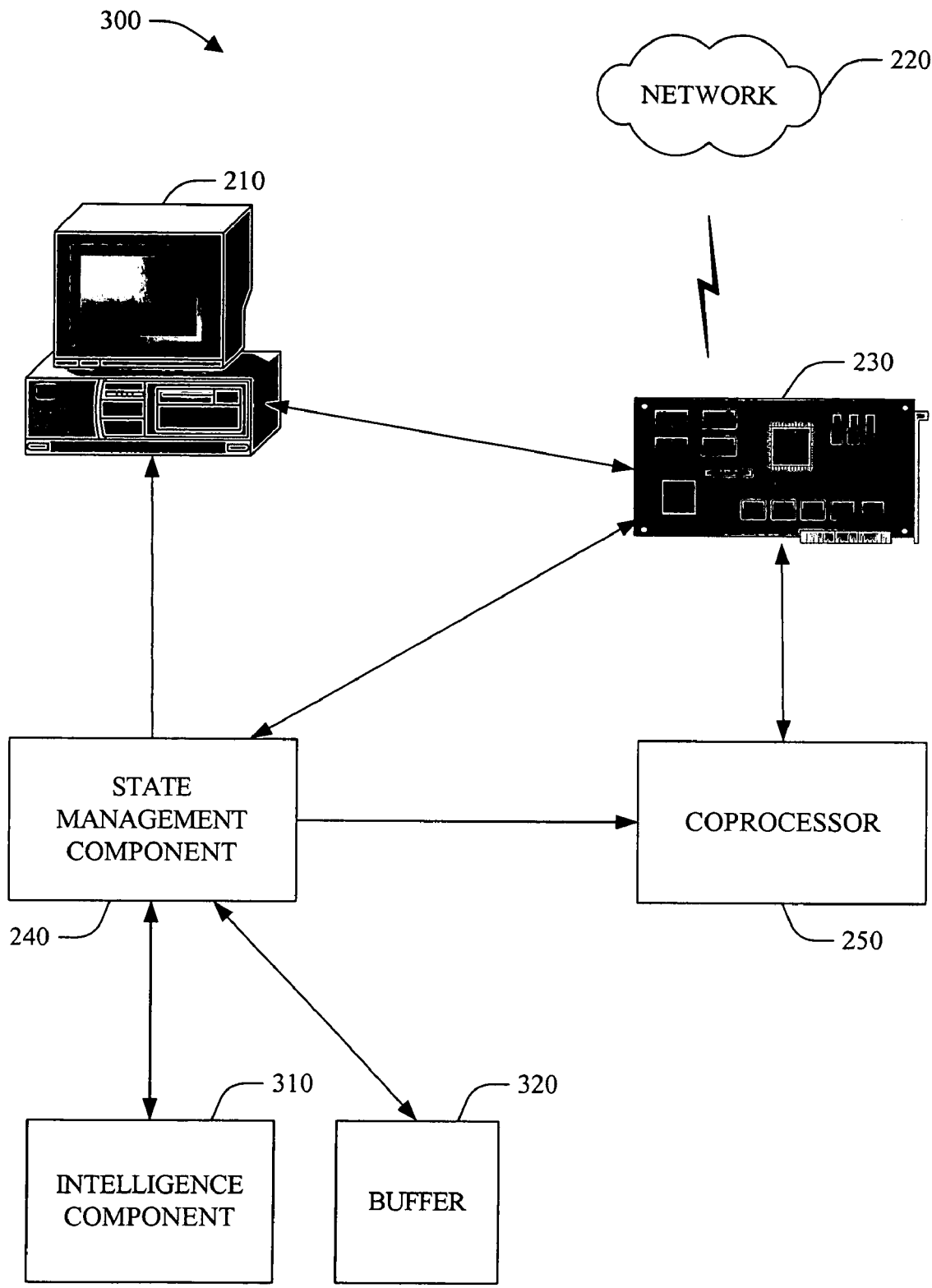
FIG. 3 illustrates an exemplary system that employs intelligence to facilitate wake state management, in accordance with an aspect of the present invention.

FIG. 3 illustrates the computing system 200, in accordance with another aspect of the present invention. Here, the system 300 further comprises an intelligence component 310. The intelligence component 310 can be utilized to facilitate interpreting incoming signals and determining whether the computer 210 or the coprocessor 250 should respond to an incoming signal. For example, the intelligence component 310 can provide a rule base and/or employ statistics, inferences, probabilities, classifiers, and/or neural networks to facilitate decision-making. Moreover, the intelligence component 310 can be utilized to determine whether the state management component 210 should continue receiving signals after the computer 210 is invoked to respond to a signal.

The system 300 further comprises a buffer 320. The buffer 320 can be utilized to store incoming signals. For example, the state management component 240 can concurrently receive incoming signals, however, it may not be able to currently handle all such received signals. When incoming signals cannot be concurrently handled, the state management component 210 can store some of the signals in the buffer 320. Such signals can be handled and/or stored based on priority or other criteria and/or in connection with decisions by the intelligence component 310. In addition, interpreted signals can be stored in the buffer 320. Stored signals can be de-queued from the buffer 320 for interpretation and/or conveyance to the computer 210 and/or coprocessor 250.

Figure 4:
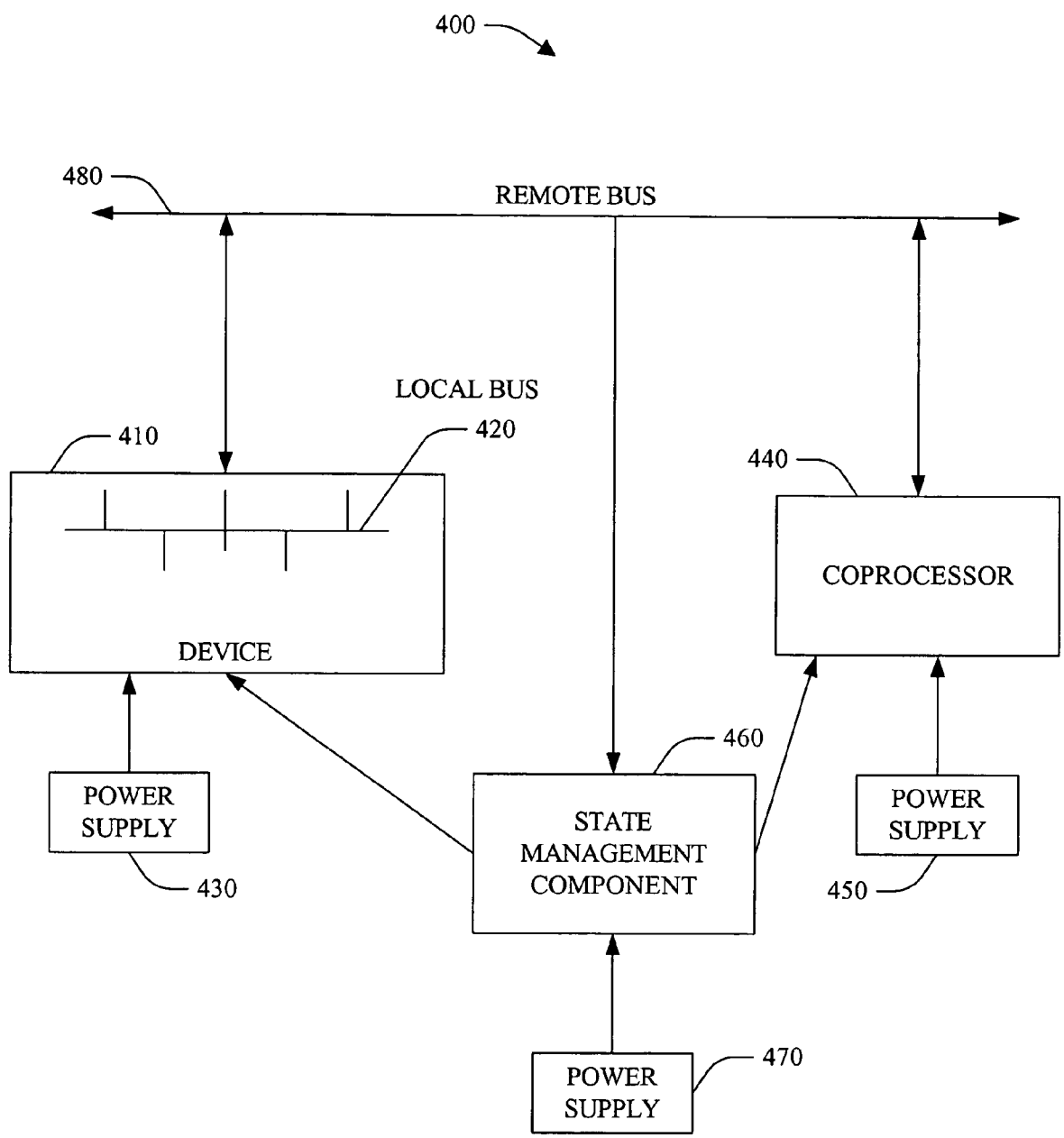
FIG. 4 illustrates an exemplary system that facilitates wake state management in connection with a device residing on a bus, in accordance with an aspect of the present invention.

FIG. 4 illustrates a system 400 that facilitates wake state management in accordance with an aspect of the present invention. The system comprises a device 410 with a local bus 420 and a power supply 430, a low power coprocessor 440 with a power supply 450, and a state management component 460 with a power supply 470, wherein the state management component 460 facilitates distributing information received via a remote bus 480 to the device 410 and/or the coprocessor 440 for processing.

The device 410 can be essentially any state machine such as a VCR, a stereo, a phone, an alarm system, an automobile ignition system, a computer, a robot, and/or an ASIC, for example. In addition, the device 410 can employ a power reduction mechanism(s) that enables at least a portion of the device 410 to operate in a lower power state, for example, for any portion that is idle. For example, the device 410 can be a copier/fax/printer/modem integrated unit with individual modules and respective power sources. Typically, the duty cycle of individual modules is relatively low. Thus, modules do not always require full power. Rather, full power is mainly required when a user and/or other device attempts to utilize a service provided by one or more of the modules.

The device 410 utilizes the associated local bus 420 to communicate or exchange data or information internally and/or with other devices and/or users. It is to be appreciated that the local bus 420 can reside internal and/or external to the device 410. Moreover, the device 410 typically is provided with power via a dedicated power source such as an associated plug connected to a conventional wall outlet (e.g., 110/120 VAC, 50/60 Hz). However, it is understood that the power can be part of a distributed or shared energy source, for example, a 360 Volt, three-phase power source. In addition, such power can be obtained from a generator, a regulator, an alternator, an isolated source (e.g., optically coupled), radio frequency, a capacitor(s), a transformer(s), a solar cell(s), a battery cell(s), a universal power supply, kinetically, mechanically, and/or via any known means of supplying power to a state machine.

The state management component 460 can utilize the coprocessor 440 to process at least a portion of incoming information in order to mitigate transitioning the device 410 from a lower power state to process the information. In general, the coprocessor 440 is a low-power consuming device, and its power (power supply 450) can be associated with a dedicated power supply and/or distributed power supply. In addition, the power supply 450 can be derived from another power supply (e.g., the device power supply 430) such as an auxiliary source. Moreover, the power supply 450 can be obtained from a generator, a regulator, an alternator, an isolated source (e.g., optically coupled), radio frequency, a capacitor(s), a transformer(s), a solar cell(s), a battery cell(s), a universal power supply, kinetically, mechanically, and/or via any known means of supplying power to a state machine.

In general, the state management component 460 can be utilized to receive incoming information and determines whether the coprocessor 440 and/or the device 410 should process the information. For example, the state management component 460 can interpret the information to determine whether the coprocessor 440 can process the information without having to wake the device 410. If the state management component 460 determines that the coprocessor 440 can process the information without the device 410, the state management component 460 invokes (e.g., elicits a transition to a higher power state) the coprocessor 440, and the coprocessor 440 processes the information. Otherwise, the state management component 460 invokes (e.g., elicits a transition to a higher power state) the device 410, which processes the information. In accordance with another aspect of the present invention, both the device 410 and the coprocessor 440 can be invoked to process the information.

The power supply 470 associated with the state management component 460 can also be a dedicated and/or shared source, as described above. Moreover, the state management component power supply 470, the device power supply 430 and the coprocessor power supply 450 can be a similar power source, be derived from a similar power source and/or be independent power sources.

By way of example, the device 410 can transition to a lower power state, wherein at least a portion of power is reduced and/or removed from portions of respective entities. The state management component 460 can be activated to manage incoming messages for the device 410 while the device 410 is in the lower power state. The remote bus 480 can be employed via another device and/or a user to transmit a signal to the device 410, wherein the signal is received by the state management component 460.

The state management component 460 can interpret this signal to determine whether the coprocessor 440 can respond to it. Continuing with the print example, printing typically involves activating paper rollers, retrieving paper from a tray based on a configuration associated with the file, prepping the cartridge (e.g., toner, ink, ribbon, ball and ink strip, and the like). Such action typically includes transitioning the device 410, or at least a printing portion of the device 410, to a full power state. The device 410 can retrieve the print file from a queue, for example, and print the document. In addition, the coprocessor 440 can be invoked to facilitate printing. For example, during a printer warm-up cycle, the coprocessor 440 can dequeue and buffer the print job to expedite printing the document. In addition, the state management component 460 can respond to a requesting component while the printer is warming up.

In another example, the signal to the printer can be a query to determine whether a print job has been completed. The state management component 460 can determine that a response to this signal does not require powering up the device 410 or any associated printing assemblies. Rather, the state management component 460 can determine that the coprocessor 440 can handle this request. Thus, the state management component 460 can invoke the coprocessor 440 instead of the device 410. The coprocessor 440 can store such information locally and/or retrieve such information, for example, from one or more registers or memory locations associated with the device 410.

Figure 5:
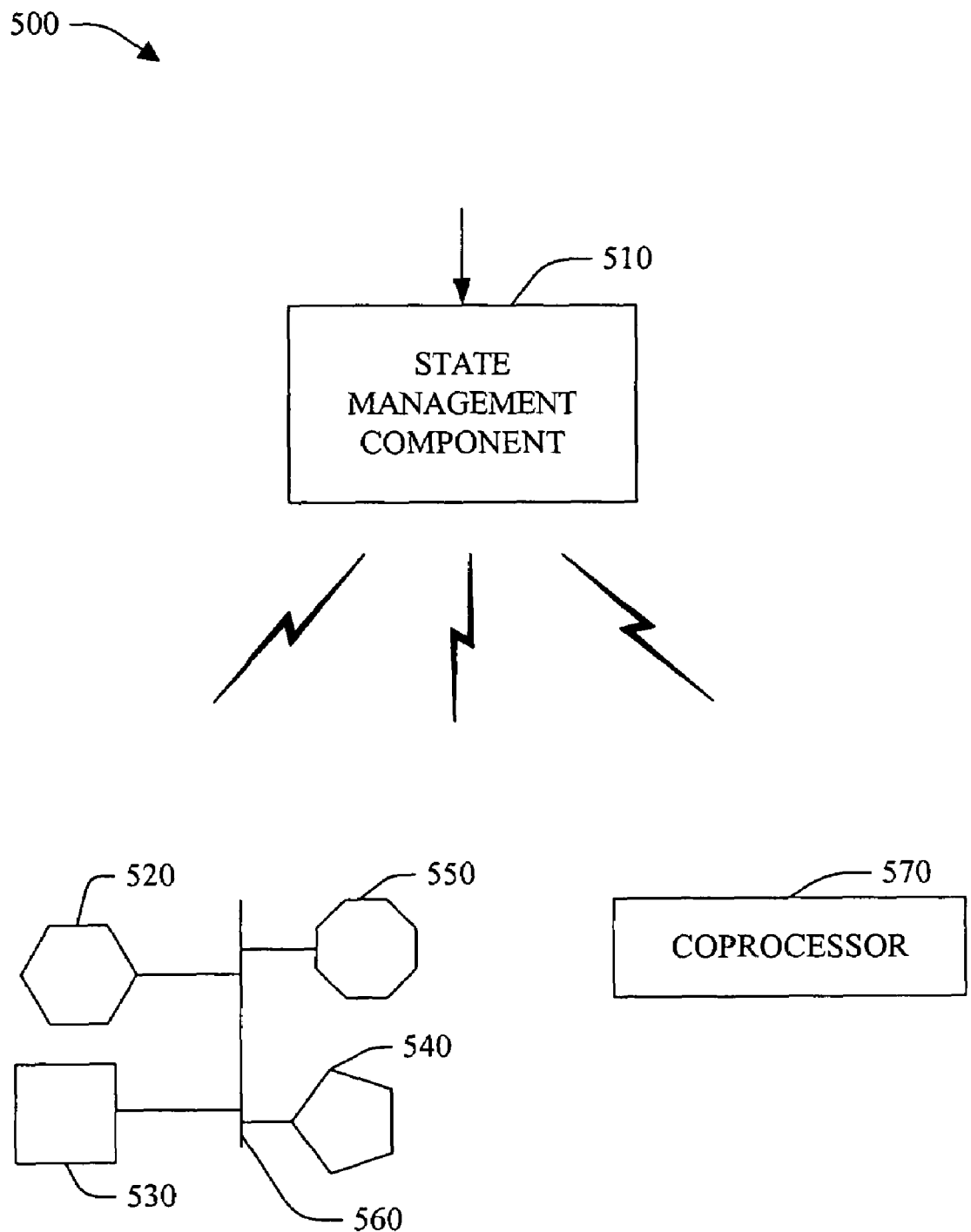
FIG. 5 illustrates an exemplary system that facilitates wake state management in connection with a plurality of devices, in accordance with an aspect of the present invention.

FIG. 5 illustrates a system 500 that facilitates wake state management for a plurality of state machines, in accordance with an aspect of the present invention. The system 500 comprises a state management component 510 that can be utilized as a central signal distributor for one or more state machines 520, 530, 540 and 550 associated with a similar bus 560 (network, backplane, etc.). The state management component 510 can be activated to receive incoming signals directed to the one or more of state machines 520-550.

As described previously, a state machine can employ the state management component 510 when the state machine transitions to a lower power state, wherein the state management component 510 can receive and interpret incoming signals and distribute the signals to the state machine and/or a coprocessor 570 for processing. The foregoing provides a mechanism to respond to various incoming signals with a low power coprocessor 570 rather than transitioning respective state machines to a full power state to process the incoming signal.

For example, when at least one of the state machines 520-550 transitions to a lower power state (e.g., standby, hibernate, suspend, sleep, and deep sleep), the state management component 510 can begin receiving incoming signals for that state machine. The state machine can request such services or the state management component 510 can detect and automatically respond to such transitions, for example, by periodically monitoring (e.g., via ping, a handshake, polling, etc.) associated state machines. In yet another example, the state machine can employ the state management component 510 while the state machine is in a high power state in order to reduce a processing load. In still another example, an act by one state machine can provide an indication to the state management component 510 to facilitate wake state management for another state machine.

Once employed, the state management component 510 can receive incoming signals for respective state machines. The state management component 510 can interpret incoming signals and determine whether the respective state machine 520-550 and/or the coprocessor 570 should be invoked to respond to the signal. If it is determined that the coprocessor 560 can respond, then the state machine can remain in the lower power state and the coprocessor 570 can respond to the signal. If it is determined that the state machine should respond to the signal, the state management component 510 can invoke the state machine to respond. If it is determined that both the state machine and the coprocessor 570 should contribute to servicing the signal, the state management component 510 can invoke both entities. After responding to the signal, the state machine and/or coprocessor 570 can return to the lower power state until the invoked again by the state management component 510 and/or other entity (e.g., a user or another state machine).

Such features can be employed serially and/or concurrently in connection with one or more of the state machines 520-550. For example, the state management component 510 can be utilized to receive incoming signals for more than one of the state machines, including all of the state machines 520-550. It is to be appreciated that direct reception can be via the state management component 510, for example, wherein the state management component 510 is utilized as a pass through, or a hardware and/or wireless connection. In addition, the state management component 510 can manage wakes states for the state machines 520-550 by receiving and interpreting all signals directed to the bus 560.

Figure 6:
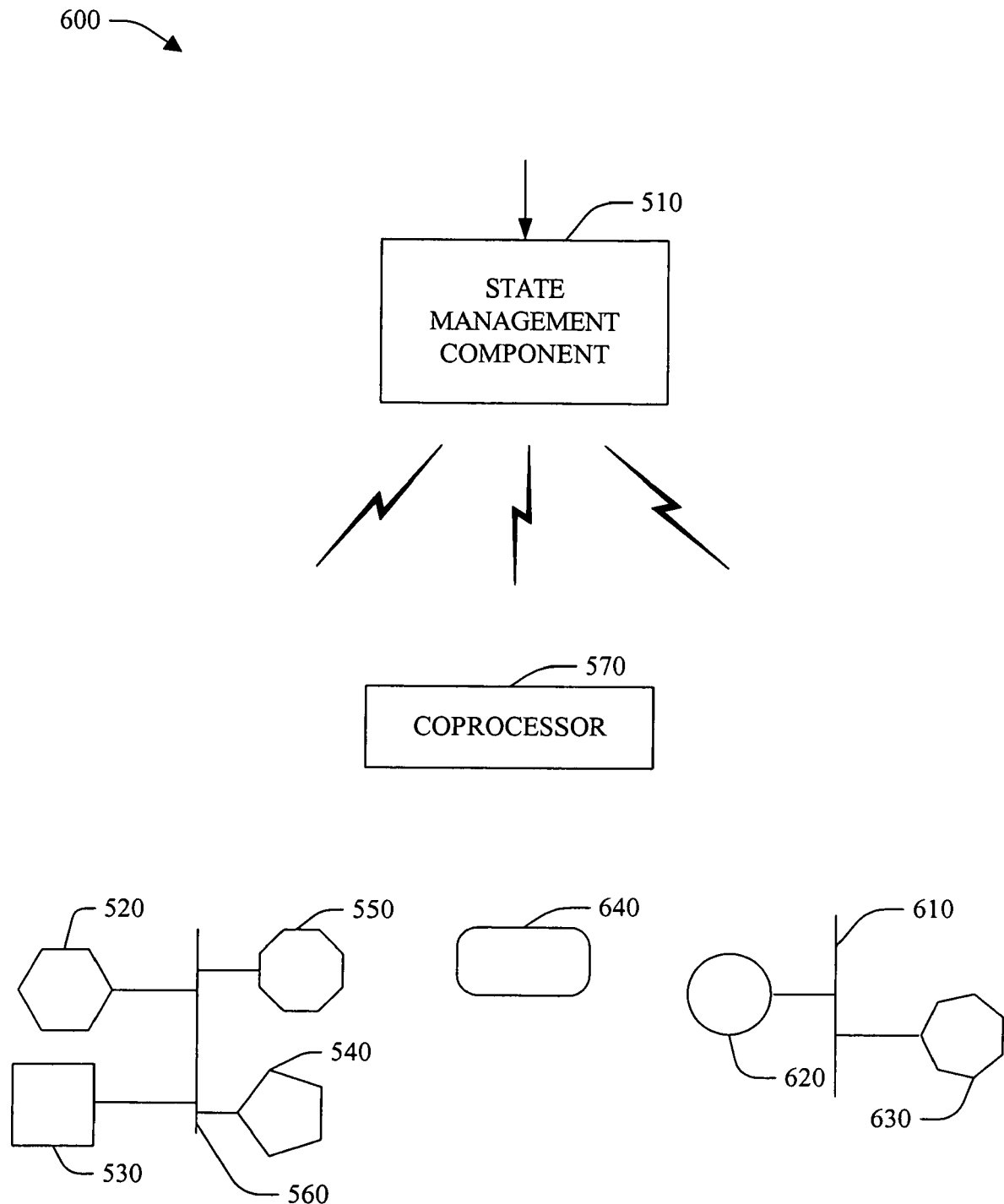
FIG. 6 illustrates an exemplary system that facilitates wake state management in connection with a plurality of networks, in accordance with an aspect of the present invention.

FIG. 6 illustrates a system 600 that facilitates wake state management for a plurality of state machines, in accordance with an aspect of the present invention. The system 600 comprises the state management component 510, the coprocessor 570, and the bus 560 with devices 520-550. The system 600 further comprises a bus 610 with devices 620 and 630. Similar to devices 520-550, the devices 620 and 630 can utilize the state management component 510 to receive incoming signals. Thus, the devices 620 and 630 can individually employ the state management component 510 and/or the state management component 510 can receive any signal directed to the bus 610.

The system 600 further comprises a device 640. Unlike the devices 520-550 and 620 and 630, the device is not associated with a bus. However, the device 640 can employ the state management component 510 to receive and initially handle incoming signals. It is to be appreciated that the state management component 510 can be concurrently employed by the bus 560 and/or devices 520-550, the bus 610 and/or devices 620-630, and/or the device 640. Furthermore, the state management component 510 can be employed redirect signals amongst the devices 520-550 and 620-640. For example, a signal transmitted to the device 630 can be routed to coprocessor 570 and/or another device. For example, it may be determined that the coprocessor 570 cannot respond to the signal, but another lesser power consuming device can respond to the signal.

Figure 7:
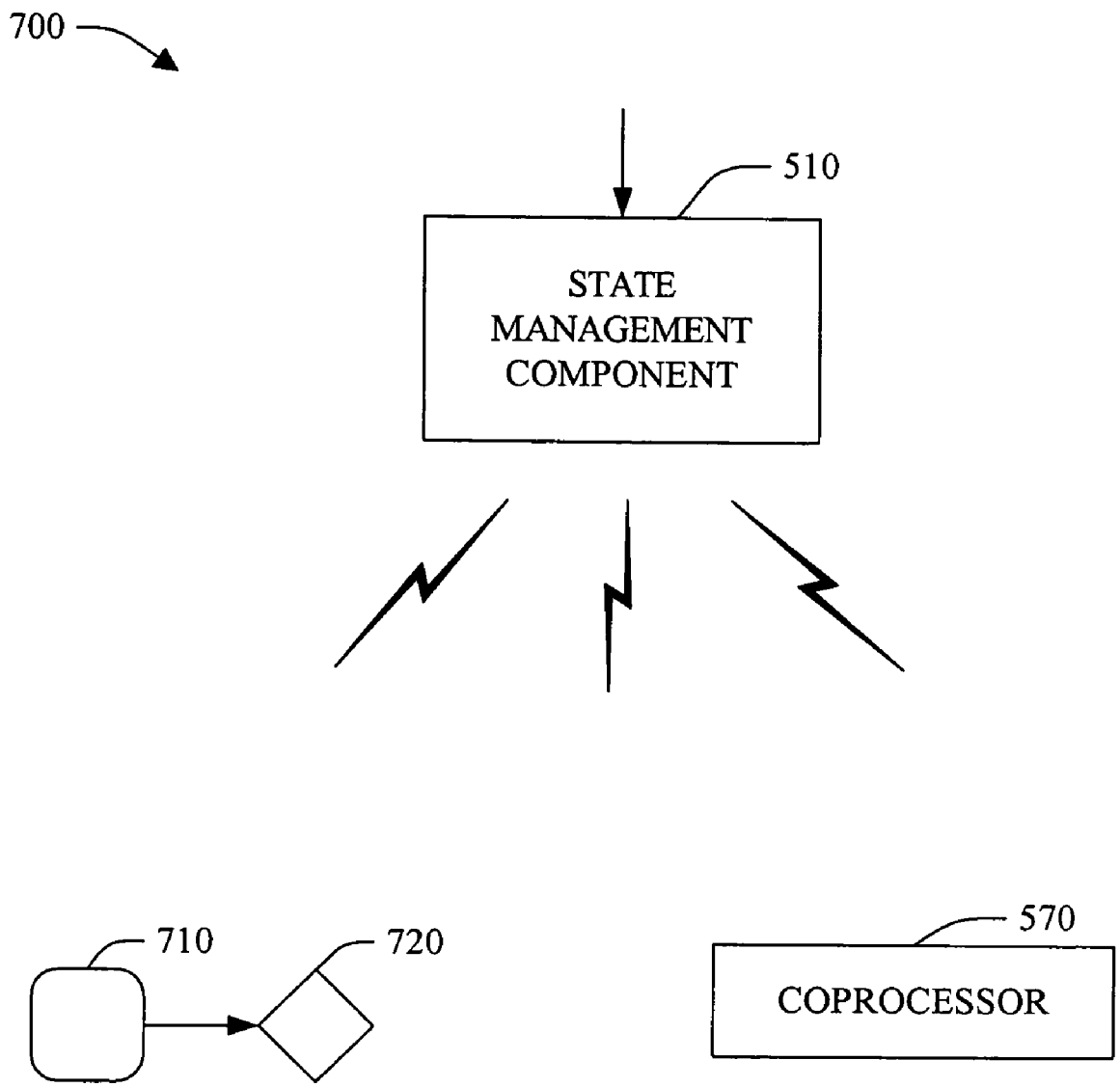
FIG. 7 illustrates an exemplary system that facilitates indirect wake state management of a device, in accordance with an aspect of the present invention.

FIG. 7 illustrates a system 700 that facilitates wake state management for a plurality of state machines, in accordance with an aspect of the present invention. The system 700 comprises the state management component 510, the coprocessor 570, a device 710, and a device 720. Similar to device 520-550 and 620-640, devices 710 and 720 can employ the state management component 510 to manage wake states by receiving and interpreting signals transmitted to the devices 710 and 720. In general, the state management component 510 invokes the coprocessor 570 to respond to incoming signals to mitigate waking the devices from a lower power state. However, when the coprocessor 570 is unable to respond, the state management component 510 invokes the respective device to respond.

Additionally, the state management component 510 can invoke a device via another device. For example, the state management component 510 can receive a signal directed to the device 720. The state management component can determine that the device 720 should respond to the signal. However, rather than wake the device 720, the state management component 510 can invoke the device 710, which invokes the device 720. For example, the device 710 can be a robot or robotic device that can perform an action (e.g., turn on) upon transitioning, for example, turning on another device. A single intervening device is depicted in FIG. 7; however, it is to be appreciated the several state machines can be invoked by one or more other state machines. For example, the device 710 can invoke device 720 and/or one or more other devices, and device 720 can invoke one or more other devices. In addition, such invocation of devices can serially and/or concurrently occur.

FIGS. 8-12 illustrate a state diagram 900, a flow diagram 1000 and method diagrams 1100 and 1200, respectively, in accordance with an aspect of the present invention. For simplicity of explanation, the diagrams are depicted and described as a series of acts. It is to be understood and appreciated that the present invention is not limited by the acts illustrated and/or by the order of acts, for example acts can occur in various orders and/or concurrently, and with other acts not presented and described herein. Furthermore, not all illustrated acts may be required to implement the methodologies in accordance with the present invention. In addition, those skilled in the art will understand and appreciate that the diagrams could alternatively be represented as a series of interrelated events.

Figure 8:
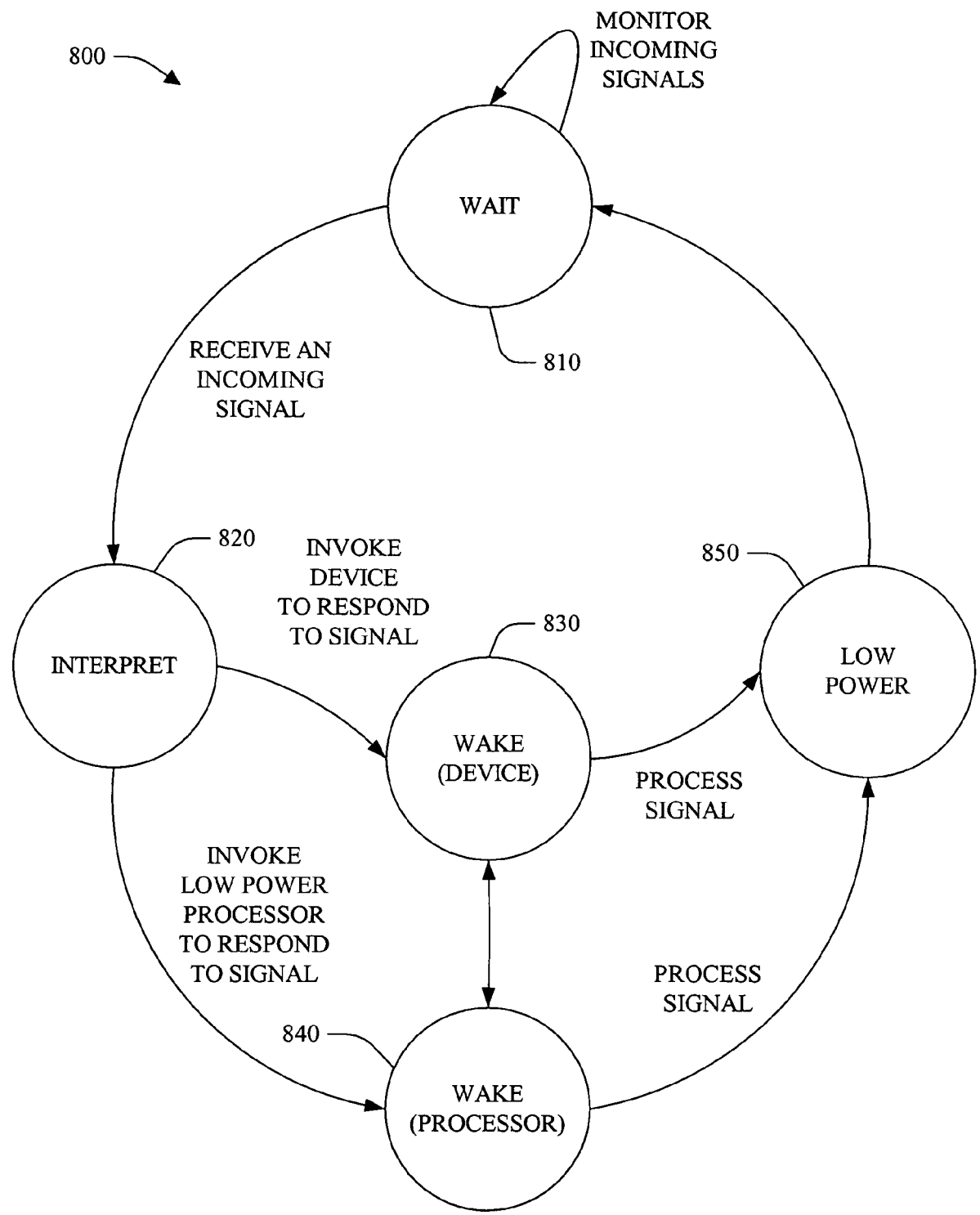
FIG. 8 illustrates an exemplary state diagram for state machine wake state management, in accordance with an aspect of the present invention.

FIG. 8 illustrates an exemplary state diagram 800, in accordance with an aspect of the present invention. A state machine can employ a power management system to handle wake states, as described herein, when the state machine transitions to a lower power state. Upon invocation, the power management system initially enters a wait state 810. It is to be appreciated that the power management system can be activated via various techniques, for example, the state machine can issue a request to the power management system and the power management system can automatically be employed after detecting that the state machine is entering or has entered a lower power state.

When employed, the power management system monitors signals transmitted to the state machine. It can be appreciated that any known monitoring technique such as polling, waiting on events or interrupts, etc. can be employed in accordance with various aspects of the subject invention. In addition, various techniques can be utilized to direct incoming signals to the power management system. Moreover, incoming signals can be stored in a queue, wherein the power management system can dequeue stored signals, for example, based on a first in first out technique, an associated priority, and/or a rule set technique.

Upon receiving a signal conveyed to the state machine, state transitions to an interpret state 820, wherein the signal is interpreted to determine suitable processing requirements. The interpretation can include analyzing and/or extracting information from the signal. It is to be appreciated that intelligence can be utilized to facilitate such interpretations. For example, a rule base can be employed to facilitate the decision process. In addition, statistics, inferences, probabilities, classifiers, decision tree learning methods, support vector machines, linear and non-linear regression and/or neural networks can be employed to facilitate decision-making. Moreover, the signal can include information that specifies a desired processing technique. For example, the state machine may desire to be invoked to respond to a particular class of signals event though a low power coprocessor (as described herein) could handle the signal without the state machine having to transition to the higher power state.

A decision regarding a suitable processing device invokes a transition to a wake state. In one aspect of the present invention, the transition is to a wake state 830, wherein the target device transitions to a full power mode and responds to the signal. In another aspect of the present invention, the transition is to a wake state 840, wherein the low power processor responds to the signal. In general, a transition to wake state 840 facilitates power conservation since the target device can remain in the lower power state. In state 840, the low-power coprocessor processes the signal, which minimizes power consumption. It is to be appreciated that transitions between states 830 and 840 can occur, for example, wherein portions of a respective incoming signal can be processed during either state.

After transitioning to a wake state, the targeted device and/or the low-power coprocessor can process the signal. It is to be appreciated that such processing can include obtaining more information and/or initiating data exchange with the requesting component. Upon processing (e.g., after completion, interruption and termination), the targeted device and/or the coprocessor can transition to a low power state 850 and state management can transition to the wait state 810.

Figure 9:
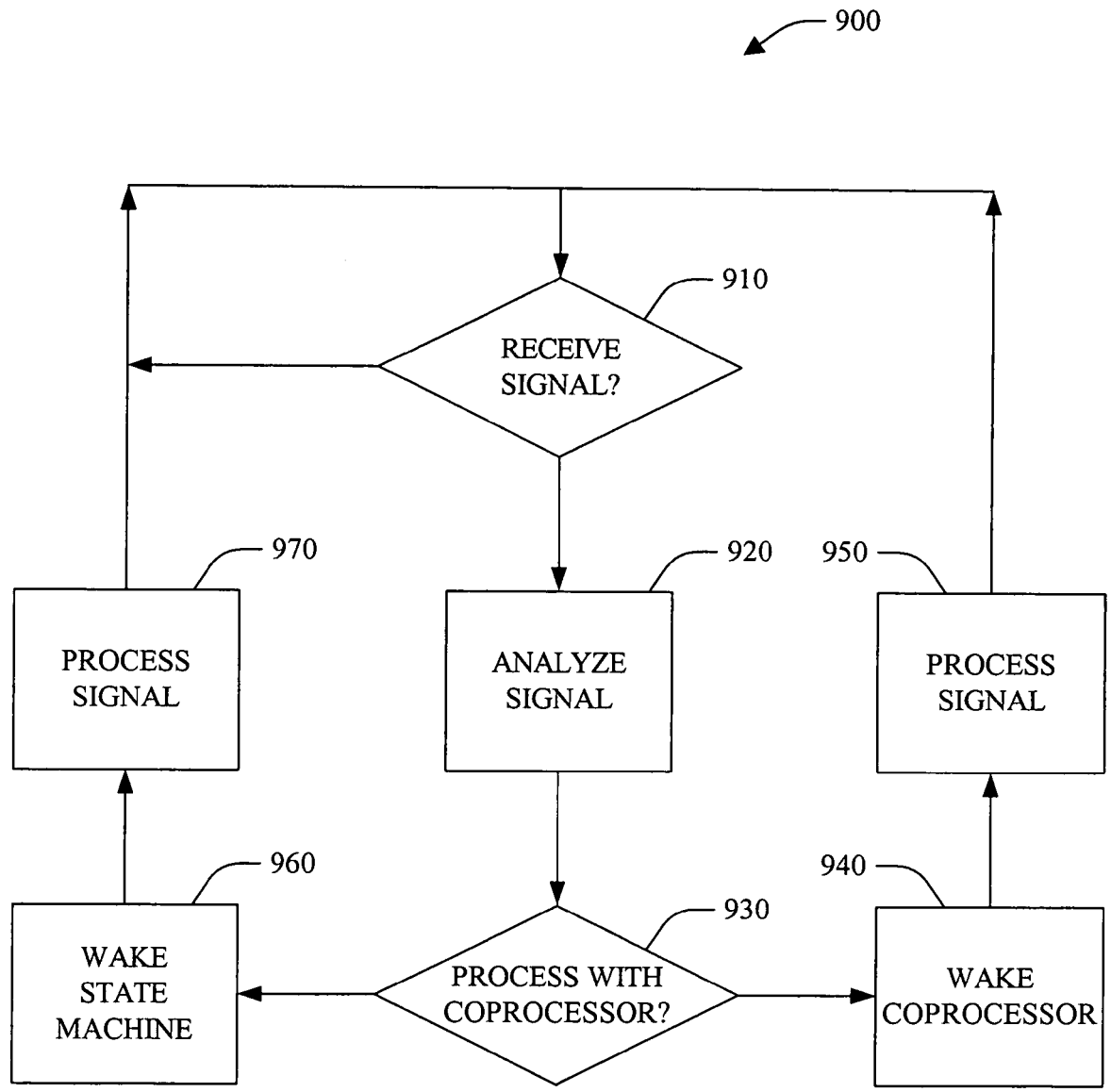
FIG. 9 illustrates an exemplary flow diagram for state machine wake state management, in accordance with an aspect of the present invention.

FIG. 9 illustrates an exemplary flow diagram 900, in accordance with an aspect of the present invention. At reference numeral 910, a state management component is employed to monitor incoming signals for at least one state machine that has transitioned from a full power state to a lower power state. It is to be appreciated that essentially any state-machine such as a computer, a VCR, a stereo, a phone, an alarm system, an automobile ignition system, for example, can utilize the state management component to facilitate wake state management when the state machine transitions to a lower power state to reduce power consumption. When employed, the power management component can receive signals transmitted to the state machine. In general, the power management component continues to monitor incoming signals until de-activated and/or an incoming signal arrives. As noted previously, the state management component can be concurrently employed to manage wake states for one or more state machines and/or one or more networks and/or busses associated with at least one state machine.

It is to be appreciated that the state management component can be activated via various mechanisms. For example, the state machine can request the services of the state management component and/or the state management component can automatically handle incoming signals upon detecting that a state machine has transitioned to a lower power state. In addition, a different state machine and/or a different state management component can initiate such wake state management.

At reference numeral 920, the received signal is interpreted. Such interpretation can provide information indicative of processing requirements and/or importance. In addition, the interpretation can include extracting data from the signal, comparing the signal with previously received signals in order to leverage past decisions, and/or transforming the signal. It is to be appreciated that incoming signals can continue to be received while a signal is under interpretation. In addition, multiple signals can be serially and/or concurrently interpreted. Furthermore, incoming signals can be conveyed to a storage medium, wherein they can be selectively retrieved. For example, a first in first out (FIFO) approach and/or a priority-based approach can be utilized. In addition, an incoming signal can be partially interpreted and saved to the storage medium for later interpretation, for example, when a signal of higher priority is received or more information is required to interpret the signal.

At 930, the interpretation can be utilized to determine whether a low-power coprocessor or the state machine should respond to the signal. Such decision can be based on a predefined processing threshold, wherein the interpretation provides a value that can be compared with the threshold. Various configurations of coprocessors can be implemented with differing degrees of processing power. Thus, the processing threshold can be defined accordingly to correspond to the coprocessor utilized. The decision can additionally or alternatively be based on the priority. For example, an estimated time to completion can be generated and utilized to select the more efficient approach. Moreover, intelligence can be employed to facilitate the decision. For example, a rule base can be utilized to facilitate the determination. In addition, the decision can be based on inferences, classifiers, probabilities, and/or statistics. It is to be appreciated that a user and/or another state machine can override this decision.

If it is determined that the low-power coprocessor should respond to the signal, then at 940 the low-power processor transitions to a higher power state and at 950 responds to the signal. If it is determined that the state machine should respond, then at 960 the state machine transitions to a high power state and at 970 the state machine responds to the signal. After responding to the signal, the low-power processor and/or the state machine can return to a lower power state.

Figure 10:
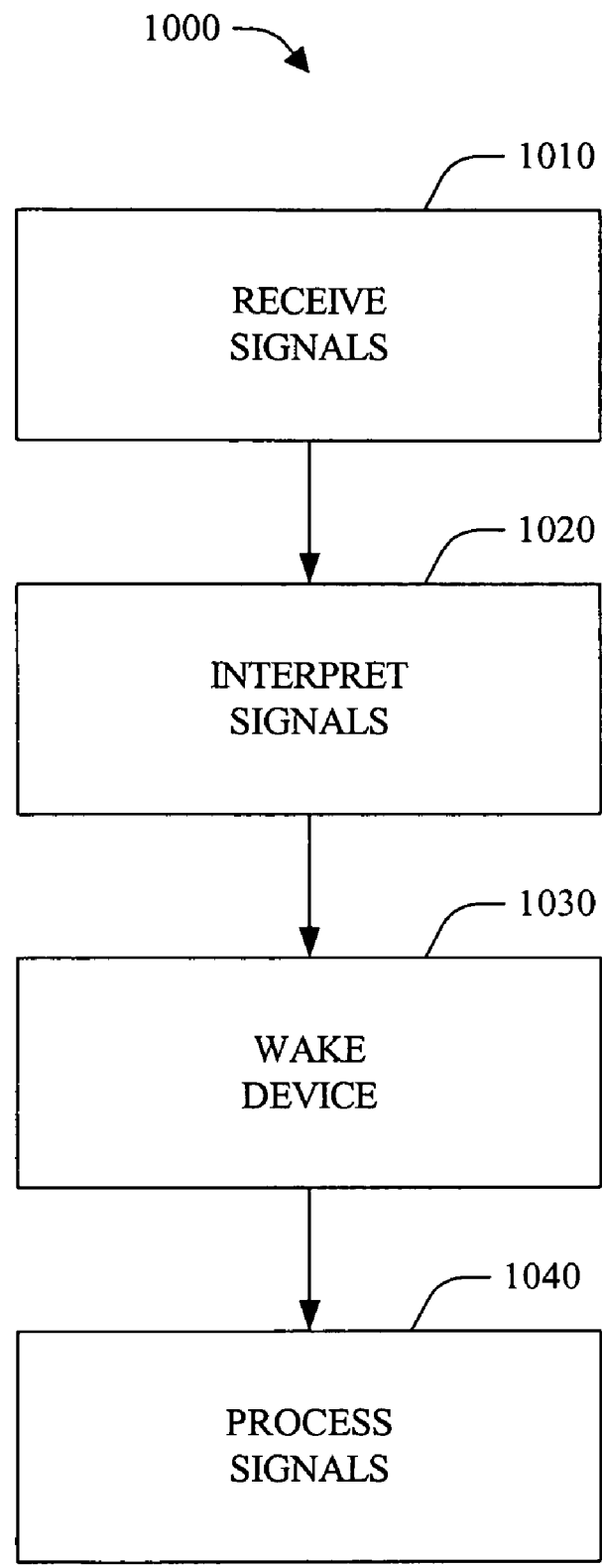
FIG. 10 illustrates an exemplary methodology for state machine wake state management, in accordance with an aspect of the present invention.

FIG. 10 illustrates an exemplary methodology that can be employed to manage state machine wake states, in accordance with an aspect of the present invention. Proceeding to reference numeral 1010, a state management system employed to receive incoming signals from a network and/or bus detects an incoming signal via polling and/or receiving a notification. In general, the power management system can wait for a signal to be conveyed to an entity in a standby, hibernate, suspend, sleep, deep sleep, and/or other lower power state.

At 1020, the state management system interprets the signal to determine whether the signal can be handled by a low-power processing component. The interpretation can include analyzing and/or extracting information from the signal and/or utilizing signal attributes and/or characteristics. In addition, intelligence can optionally be employed. At 1030, the interpretation is utilized to determine whether a low-power coprocessor or the state machine should process the signal. If it is determined that the low power coprocessor can process the signal, the state machine can remain in a lower power state, which minimizes power consumption, and the low power coprocessor transitions to a high power state. However, if it is determined that the state machine should process the signal, the state machine is notified to transition to a higher power state.

At 1040, the signal is processed by the low power processor or the state machine. For example, if the low power coprocessor is utilized, the signal is provided to the coprocessor and the coprocessor responds. If the state machine is utilized, the state machine is provided with the signal and the state machine responds. It is to be appreciated that both the low power coprocessor and the state machine can be utilized to process the signal. At 1050, the state machine and/or coprocessor transitions back to a low power state.

Figure 11:
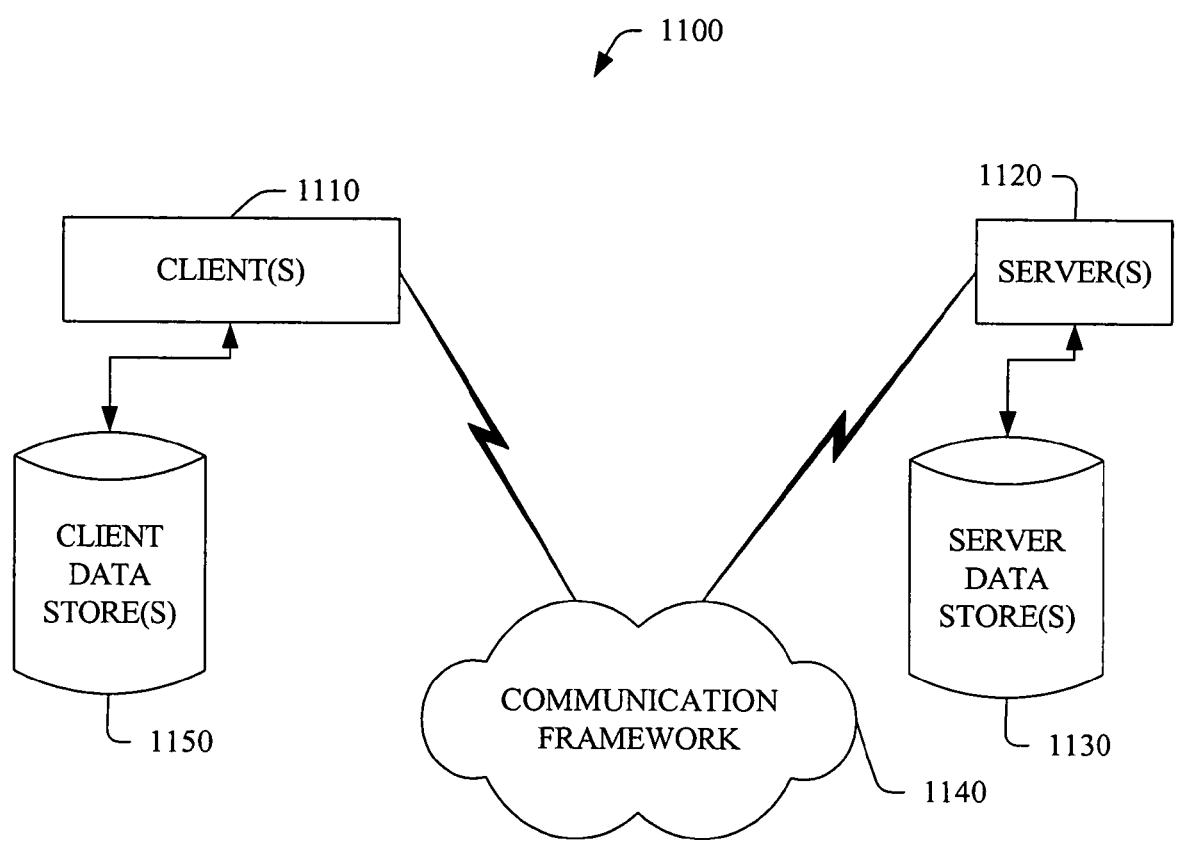
FIG. 11 illustrates an exemplary networking environment, wherein the novel aspects of the present invention can be employed.
Figure 12:
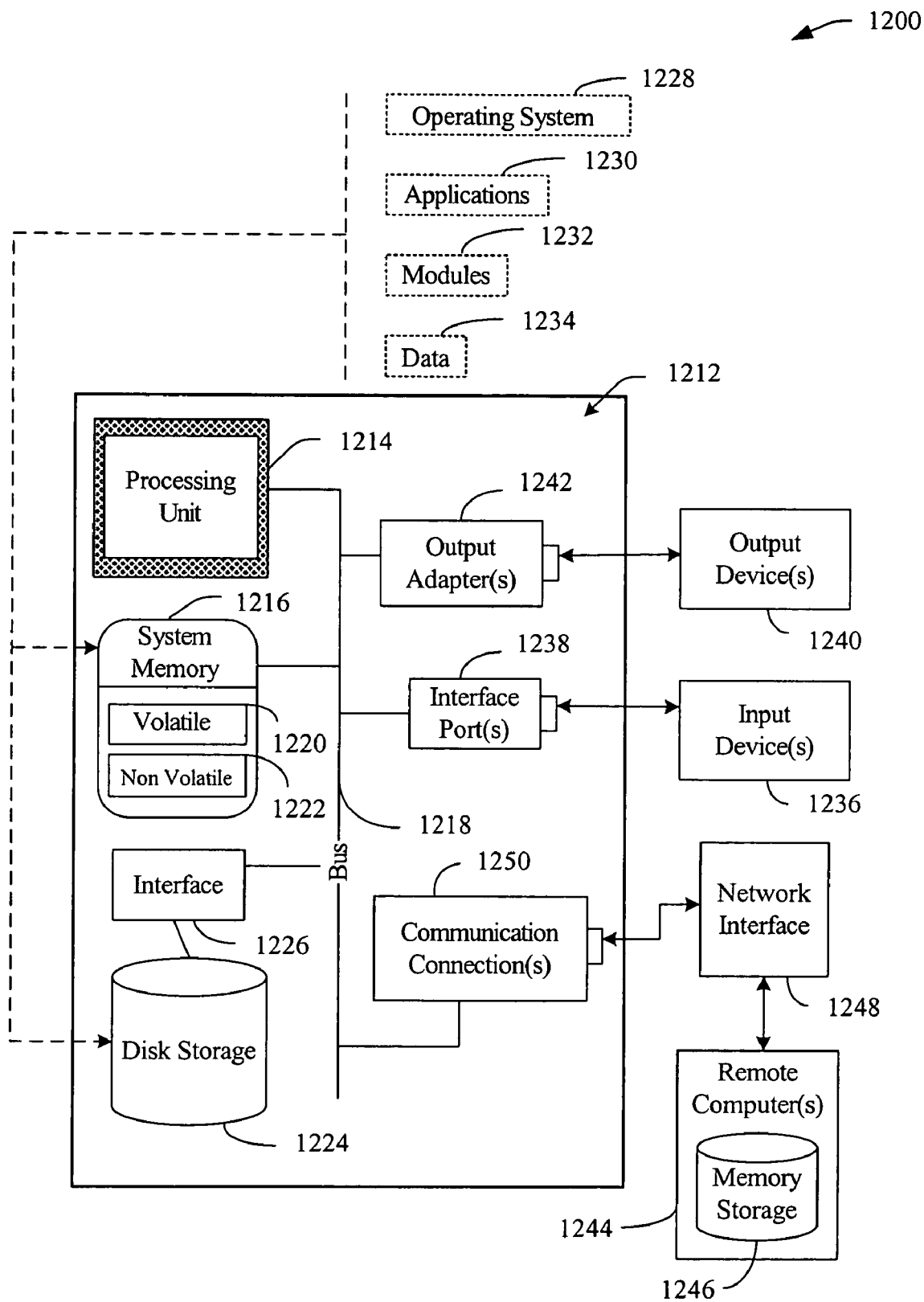
FIG. 12 illustrates an exemplary operating environment, wherein the novel aspects of the present invention can be employed.

In order to provide a context for the various aspects of the invention, FIGS. 11 and 12 as well as the following discussion are intended to provide a brief, general description of a suitable computing environment in which the various aspects of the present invention can be implemented. While the invention has been described above in the general context of computer-executable instructions of a computer program that runs on a computer and/or computers, those skilled in the art will recognize that the invention also can be implemented in combination with other program modules. Generally, program modules include routines, programs, components, data structures, etc. that perform particular tasks and/or implement particular abstract data types.

Moreover, those skilled in the art will appreciate that the inventive methods may be practiced with other computer system configurations, including single-processor or multi-processor computer systems, mini-computing devices, mainframe computers, as well as personal computers, hand-held computing devices, microprocessor-based or programmable consumer electronics, and the like. The illustrated aspects of the invention may also be practiced in distributed computing environments where task are performed by remote processing devices that are linked through a communications network. However, some, if not all aspects of the invention can be practiced on stand-alone computers. In a distributed computing environment, program modules may be located in both local and remote memory storage devices.

FIG. 11 is a schematic block diagram of a sample-computing environment 1100 with which the present invention can interact. The system 1100 includes one or more client(s) 1110. The client(s) 1110 can be hardware and/or software (e.g., threads, processes, computing devices). The system 1100 also includes one or more server(s) 1120. The server(s) 1120 can also be hardware and/or software (e.g., threads, processes, computing devices). The servers 1120 can house threads to perform transformations by employing the present invention, for example.

One possible communication between a client 1110 and a server 1120 can be in the form of a data packet adapted to be transmitted between two or more computer processes. The system 1100 includes a communication framework 1140 that can be employed to facilitate communications between the client(s) 1110 and the server(s) 1120. The client(s) 1110 are operably connected to one or more client data store(s) 1150 that can be employed to store information local to the client(s) 1110. Similarly, the server(s) 1120 are operably connected to one or more server data store(s) 1130 that can be employed to store information local to the servers 1140.

With reference to FIG. 12, an exemplary environment 1210 for implementing various aspects of the invention includes a computer 1212. The computer 1212 includes a processing unit 1214, a system memory 1216, and a system bus 1218. The system bus 1218 couples system components including, but not limited to, the system memory 1216 to the processing unit 1214. The processing unit 1214 can be any of various available processors. Dual microprocessors and other multiprocessor architectures also can be employed as the processing unit 1214.

The system bus 1218 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), IEEE 1394, and Small Computer Systems Interface (SCSI).

The system memory 1216 includes volatile memory 1220 and nonvolatile memory 1222. The basic input/output system (BIOS), containing the basic routines to transfer information between elements within the computer 1212, such as during start-up, is stored in nonvolatile memory 1222. By way of illustration, and not limitation, nonvolatile memory 1222 can include read only memory (ROM), programmable ROM (PROM), electrically programmable ROM (EPROM), electrically erasable ROM (EEPROM), or flash memory. Volatile memory 1220 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1212 also includes removable/non-removable, volatile/non-volatile computer storage media. FIG. 12 illustrates, for example a disk storage 1224. Disk storage 1224 includes, but is not limited to, devices like a magnetic disk drive, floppy disk drive, tape drive, Jaz drive, Zip drive, LS-100 drive, flash memory card, or memory stick. In addition, disk storage 1224 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1224 to the system bus 1218, a removable or non-removable interface is typically used such as interface 1226.

It is to be appreciated that FIG. 12 describes software that acts as an intermediary between users and the basic computer resources described in suitable operating environment 1210. Such software includes an operating system 1228. Operating system 1228, which can be stored on disk storage 1224, acts to control and allocate resources of the computer system 1212. System applications 1230 take advantage of the management of resources by operating system 1228 through program modules 1232 and program data 1234 stored either in system memory 1216 or on disk storage 1224. It is to be appreciated that the present invention can be implemented with various operating systems or combinations of operating systems.

A user enters commands or information into the computer 1212 through input device(s) 1236. Input devices 1236 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1214 through the system bus 1218 via interface port(s) 1238. Interface port(s) 1238 include, for example, a serial port, a parallel port, a game port, and a universal serial bus (USB). Output device(s) 1240 use some of the same type of ports as input device(s) 1236. Thus, for example, a USB port may be used to provide input to computer 1212, and to output information from computer 1212 to an output device 1240. Output adapter 1242 is provided to illustrate that there are some output devices 1240 like monitors, speakers, and printers, among other output devices 1240, which require special adapters. The output adapters 1242 include, by way of illustration and not limitation, video and sound cards that provide a means of connection between the output device 1240 and the system bus 1218. It should be noted that other devices and/or systems of devices provide both input and output capabilities such as remote computer(s) 1244.

Computer 1212 can operate in a networked environment using logical connections to one or more remote computers, such as remote computer(s) 1244. The remote computer(s) 1244 can be a personal computer, a server, a router, a network PC, a workstation, a microprocessor based appliance, a peer device or other common network node and the like, and typically includes many or all of the elements described relative to computer 1212. For purposes of brevity, only a memory storage device 1246 is illustrated with remote computer(s) 1244. Remote computer(s) 1244 is logically connected to computer 1212 through a network interface 1248 and then physically connected via communication connection 1250. Network interface 1248 encompasses communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1250 refers to the hardware/software employed to connect the network interface 1248 to the bus 1218. While communication connection 1250 is shown for illustrative clarity inside computer 1212, it can also be external to computer 1212. The hardware/software necessary for connection to the network interface 1248 includes, for exemplary purposes only, internal and external technologies such as, modems including regular telephone grade modems, cable modems and DSL modems, ISDN adapters, and Ethernet cards.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the invention. In this regard, it will also be recognized that the invention includes a system as well as a computer-readable medium having computer-executable instructions for performing the acts and/or events of the various methods of the invention.

In addition, while a particular feature of the invention may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

What is claimed is:

1. A system that facilitates state machine power management, comprising:
    a state management component that receives at least one signal that is directed to a state machine, the state management component evaluates the signal to ascertain whether at least one of a coprocessor or the state machine services the signal based in part on determined processing requirements of the signal, the evaluation includes intelligent analysis comprising at least one of a rule base or employ at least one of statistics, inferences, probabilities, classifiers, decision tree learning methods, support vector machines, linear and non-linear regression or neural networks to facilitate decision-making, the state management component determines if the state machine should continue receiving signals after the state machine is invoked to service a signal based in part on the intelligent analysis;
    the coprocessor services the signal in order to provide a timely response to the signal and facilitates state machine power management without transitioning the state machine to a high power state if determined that the coprocessor can completely service the received signal based on the evaluation; and
    the state machine services the signal upon evaluation that the coprocessor cannot service the signal without transitioning the state machine to the high power state.

2. The system of claim 1, the state machine employs the state management component to receive the signal when the state machine transitions from a high power state to a lower power state.

3. The system of claim 2, the lower power state comprises one of a standby state, a suspend state, a hibernate state, a sleep state, a deep sleep state, and an off state.

4. The system of claim 1, further comprising an analysis component that interprets the signal.

5. The system of claim 1, further comprising a decision component that determines whether the coprocessor should respond to the signal.

6. The system of claim 1, the state management component is activated by one of the state machine requesting the services of the state management component and the state management component detecting the state machine transitioned to the lower power state.

7. The system of claim 1, the system consumes less or equal power when the coprocessor responds to the signal in comparison to when the state machine responds to the signal.

8. The system of claim 1, the state management component is employed to concurrently manage wake states for a plurality of state machines.

9. The system of claim 1, further comprising an intelligence component that facilitates at least one of interpreting the signal and distributing the signal for processing.

10. The system of claim 1, the state management component invokes the state machine to respond to the signal when the coprocessor cannot respond to the signal.

11. The system of claim 1, the signal is transmitted over one of a network, a backplane, and a bus.

12. The system of claim 1, the state management component is employed to reduce state machine load for a state machine in a full power state.

13. A method that manages wake states for state machines, comprising:
    receiving a signal transmitted to a state machine;
    intelligently interpreting the signal, the interpretation can include at least one of a rule base or employ at least one of statistics, inferences, probabilities, classifiers, decision tree learning methods, support vector machines, linear and non-linear regression or neural networks to facilitate decision-making;
    determining processing requirements of the signal based in part on the intelligent interpretation;
    determining whether at least one of a coprocessor or the state machine should service the signal based on the determined processing requirements of the signal;
    determining whether a coprocessor can completely service the received signal based in part on the interpretation;
    invoking the coprocessor to service the signal when it is determined that the coprocessor should respond to the signal without transitioning the state machine to a high power state such that the coprocessor can completely service the received signal based in part on the determined processing requirements of the received signal;
    invoking the state machine to service the signal when it is determined that the coprocessor cannot service the signal; and determining if one or more state machines should continue receiving signals after the state machine is invoked to service a signal based in part on the intelligent interpretation.

14. The method of claim 13, the state machine employs the state management component when in a low power state.

15. The method of claim 13, the coprocessor is a low-power consuming device.

16. The method of claim 13, further comprising employing intelligence to facilitate at least one of interpreting the signal and determining whether the coprocessor should respond to the signal.

17. The method of claim 13, further comprising invoking the state machine to respond to the signal when it is determined that the coprocessor cannot respond to the signal.

18. The method of claim 13, further comprising receiving signals for a state machine in a full power state in order to reduce state machine load.

19. The method of claim 13, further comprising concurrently receiving signals directed to a plurality of state machines associated with at least one or more of a disparate network, a disparate bus, and a disparate backplane, wherein the coprocessor is employed to respond to at least one signal associate with at least one state machine.

20. A method that facilitates state machine power management, comprising:
    activating a state manager to receive signals directed to one or more state machines residing in a low power state;
    intelligently analyzing a received signal to determine processing requirements, the analysis can include at least one of a rule base or employ at least one of statistics, inferences, probabilities, classifiers, decision tree learning methods, support vector machines, linear and non-linear regression or neural networks to facilitate decision-making;
    determining whether a coprocessor can completely service the received signal based in part on the analysis;
    transitioning at least one of the state machines or the coprocessor to a high power state based on the processing requirements of the received signal;
    interpreting the signals to determine whether at least one of a coprocessor or the state machines should process the received signal;
    employing the coprocessor to process the received signal without transitioning the state machines to a high power state when determined that the coprocessor can completely service the received signal based in part on the determined processing requirements of the received signal;
    employing the state machines to process the received signal when determined that the coprocessor cannot service the received signal; and
    determining if the state machines should continue receiving signals after the state machine is invoked to service a signal based in part on the intelligent analysis.

21. The method of claim 20, the state manager is activated when at least one state machine transitions from a high power state to the low power state.

22. The method of claim 21, the low power state comprises one of a standby state, a suspend state, a hibernate state, a sleep state, a deep sleep state, and an off state.

23. The method of claim 20, the state manager is activated by one of a state machine request and detecting when a state machine transitions to the low power state.

24. The method of claim 20, further comprising employing at least one of the state machines to respond to the signals.

25. A data packet transmitted between two or more computer components that facilitates state machine power management, comprising:
    a component that receives a signal transmitted to a state machine;
    a component that intelligently analyzes the signal to determine processing requirements for the signal, the analysis can include at least one of a rule base or employ at least one of statistics, inferences, probabilities, classifiers, decision tree learning methods, support vector machines, linear and non-linear regression or neural networks to facilitate decision-making;
    a component that determines whether at least one of a coprocessor or the state machine should service the incoming signal based on the processing requirements of the signal;
    a component that invokes at least one of the coprocessor or the state machine to service the incoming signal, wherein the coprocessor responds without transitioning the state machine out of the low power state to service the signal if determined that the coprocessor can process the signal entirely based in part on the determined processing requirements; and
    a component that determines if the state machine should continue receiving signals after the state machine is invoked to service a signal based in part on the intelligent analysis.

26. A computer readable medium storing computer executable components that facilitates state machine power management, comprising:
    a component that a receives a signal transmitted to a state machine in a lower power state;
    a component that intelligently analyzes the signal to determine processing requirements for the signal, the intelligent analysis can include at least one of a rule base or employ at least one of statistics, inferences, probabilities, classifiers, decision tree learning methods, support vector machines, linear and non-linear regression or neural networks to facilitate decision-making;
    a component that interprets the signal to determine whether at least one of a coprocessor or a state machine can process the signal based in part on the determined processing requirements, the coprocessor processes the received signal without transitioning the state machines to a high power state when determined that the coprocessor can completely service the received signal based in part on the determined processing requirements of the received signal;
    a component that processes the signal when the determined processing requirements indicate that the signal should be processed without the state machine so that the state machine remains in the lower power state, and
    a component that determines if the state machine should continue receiving signals after the state machine is invoked to service a signal based in part on the intelligent analysis.

27. A system that facilitates state machine power management, comprising:
    means for receiving a signal directed to a state machines in a lower power state;
    means for intelligently interpreting the signal to determine the processing requirements for the signal, the interpretation can include at least one of a rule base or employ at least one of statistics, inferences, probabilities, classifiers, decision tree learning methods, support vector machines, linear and non-linear regression or neural networks to facilitate decision-making;

means for determining whether at least one of a low power element or the state machines can process the signal based in part on the determined processing requirements;

means for servicing the signal without transitioning the state machines to a high power state when determined that the low power element can entirely process the signal based in part on the determined processing requirements; and means for determining if the state machines should continue receiving signals after the state machine is invoked to service a signal based in part on the intelligent analysis.

* * * * *